United States Patent
Hyun et al.

(10) Patent No.: US 7,561,885 B2
(45) Date of Patent: Jul. 14, 2009

(54) POSITIONING SYSTEM AND METHOD USING MOBILE INTERNET SIGNAL

(75) Inventors: Moon-Pil Hyun, Suwon-si (KR); Jin-Won Kim, Seoul (KR); Hyun-Su Hong, Seongnam-si (KR); Jong-Sun Pyo, Suwon-si (KR); Ji-Youn Jeon, Seoul (KR)

(73) Assignee: Samsung Electronics Co., Ltd (KR)

( * ) Notice: Subject to any disclaimer, the term of this patent is extended or adjusted under 35 U.S.C. 154(b) by 493 days.

(21) Appl. No.: 11/321,787

(22) Filed: Dec. 29, 2005

(65) Prior Publication Data
US 2006/0148491 A1 Jul. 6, 2006

(30) Foreign Application Priority Data
Jan. 4, 2005 (KR) .................. 10-2005-0000647

(51) Int. Cl.
*H04W 24/00* (2006.01)
(52) U.S. Cl. .............. 455/456.1; 455/456.5; 455/404.2; 455/422.1; 455/67.16
(58) Field of Classification Search .............. 455/456.1, 455/456.3, 456.4, 456.5, 404.2, 422.1, 67.11, 455/67.13, 67.16
See application file for complete search history.

(56) References Cited
U.S. PATENT DOCUMENTS

| 7,206,573 | B1* | 4/2007 | Weaver et al. ............... 455/423 |
|---|---|---|---|
| 7,302,269 | B1* | 11/2007 | Crawford et al. .......... 455/456.1 |
| 7,383,049 | B2* | 6/2008 | Deloach et al. ........... 455/456.1 |
| 2003/0064733 | A1* | 4/2003 | Okanoue et al. ............. 455/456 |
| 2004/0063439 | A1* | 4/2004 | Glazko et al. ............... 455/455 |
| 2004/0120386 | A1* | 6/2004 | Grilli et al. .................. 375/148 |
| 2004/0203864 | A1* | 10/2004 | DiBuduo ................. 455/456.1 |
| 2004/0203865 | A1* | 10/2004 | Krasner ................... 455/456.1 |
| 2005/0037775 | A1* | 2/2005 | Moeglein et al. .......... 455/456.1 |

* cited by examiner

*Primary Examiner*—Huy Q Phan
(74) *Attorney, Agent, or Firm*—The Farrell Law Firm, LLP

(57) ABSTRACT

A positioning system using a mobile Internet signal is disclosed. The positioning system includes access points for transmitting downlink signals for mobile Internet communications, an access terminal for generating positioning information using the downlink signals received from the access points and access point information on the access points, and a position determination entity (PDE) for calculating range values between the access terminal and the access points using the positioning information from the access terminal and determining a position of the access terminal using the range values. Since the positioning system determines the position using the mobile Internet signal, an accurate terminal position can be determined even in such environments as downtown, shaded and indoor areas.

18 Claims, 9 Drawing Sheets

POSITIONING SYSTEM AND METHOD USING MOBILE INTERNET SIGNAL

PRIORITY

This application claims priority to an application entitled "Positioning System and Method Using Mobile Internet Signal" filed in the Korean Industrial Property Office on Jan. 4, 2005 and assigned Ser. No. 2005-00647, the contents of which are incorporated herein by reference.

BACKGROUND OF THE INVENTION

1. Field of the Invention

The present invention relates to a positioning system, and more particularly to a positioning system and method using a mobile Internet signal.

2. Description of the Related Art

Recently, positioning technology has been commonly used in various fields such as navigation devices for vehicles and ships, and positioning systems for mobile communication terminals.

Types of commonly used positioning technology include a global positioning system (GPS) signal and a pilot signal of an access point (or a base station).

The positioning technology using the GPS signal calculates ranges between a satellite and GPS receivers using a code that is transmitted by a carrier of the GPS signal transmitted from the GPS satellite, and determines positions of the GPS receivers using the calculated ranges.

The positioning technology using the pilot signal of the access point calculates ranges between the access point and access terminals using a pseudo random noise (PN) phase of the pilot channel transmitted from time-synchronized access points, and determines positions of the terminals using the calculated ranges.

However, although the positioning technology using the GPS signal can easily perform the position determination in an open sky environment where the GPS signal is strengthened, it cannot perform the position determination in a downtown area, shaded area, indoor area and other areas where the GPS signal is weakened.

Furthermore, the positioning technology using the pilot signal of a mobile communication network causes a large receiving error due to a high resolution of the pilot signal, and cannot perform an accurate position determination due to a receiving error caused when a repeater exists between the access point and an access terminal.

Accordingly, a more accurate positioning technology having improved performance over the positioning technologies using the GPS signal and the pilot signal of the access point is necessary.

Recently, a mobile Internet system has been developed for use with a mobile communication having nationwide service area and high mobility and a wireless Local Area Network (LAN) supporting an indoor, ultrahigh-speed transmission. This portable Internet system makes it possible to obtain or use diverse information and content by accessing the Internet at high speed using a mobile terminal.

The mobile Internet system described above does not consider the receiving error due to the repeater since it has a high signal receiving rate, and does not require the repeater even in the weak signal areas. Accordingly, the mobile Internet system can perform a more accurate and efficient position determination than the positioning methods using the existing pilot signal and the GPS signal, using the mobile Internet signal.

SUMMARY OF THE INVENTION

Accordingly, the present invention has been designed to solve the above and other problems occurring in the prior art, and an object of the present invention is to provide a positioning system and method that can perform a positioning of a mobile terminal using a mobile Internet signal that is receivable indoors and has a small receiving error.

Another object of the present invention is to provide a positioning system and method that can perform terminal positioning using both a mobile Internet signal and an existing mobile communication signal.

In order to accomplish the above and other objects, there is provided a positioning system using a mobile Internet signal including access points for transmitting downlink signals for mobile Internet communications, an access terminal for generating positioning information using the downlink signals received from the access points and access point information on the access points, and a position determination entity (PDE) for calculating range values between the access terminal and the access points using the positioning information from the access terminal and determining the position of the access terminal using the range values.

In another aspect of the present invention, there is provided a positioning system using a mobile Internet signal, including access points for transmitting downlink signals for mobile Internet communications and pilot signals for mobile communications, an access terminal for receiving the downlink signals and the pilot signals, and generating positioning information using the downlink signals with access point information and the pilot signals, respectively, and a position determination entity (PDE) for calculating range values between the access terminal and the access points using the positioning information from the access terminal and determining the position of the access terminal using calculated range values.

In still another aspect of the present invention, there is provided a positioning method using a mobile Internet signal, including using an access terminal to receive downlink signals for mobile Internet communications from access points, generating positioning information using access point information on the access points and the downlink signals, and calculating range values between the access terminal and the access points using the positioning information and calculating a position of the access terminal using the range values.

In still another aspect of the present invention, there is provided a positioning method using a mobile Internet signal, including transmitting downlink signals for mobile Internet communications and pilot signals for mobile communications from access points, receiving the downlink signals from an access terminal, generating mobile Internet positioning information and mobile communication positioning information using the access points, and calculating range values between the access terminal and the access points using the mobile Internet positioning information and the mobile communication positioning information, and calculating a position of the access terminal using the range values.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
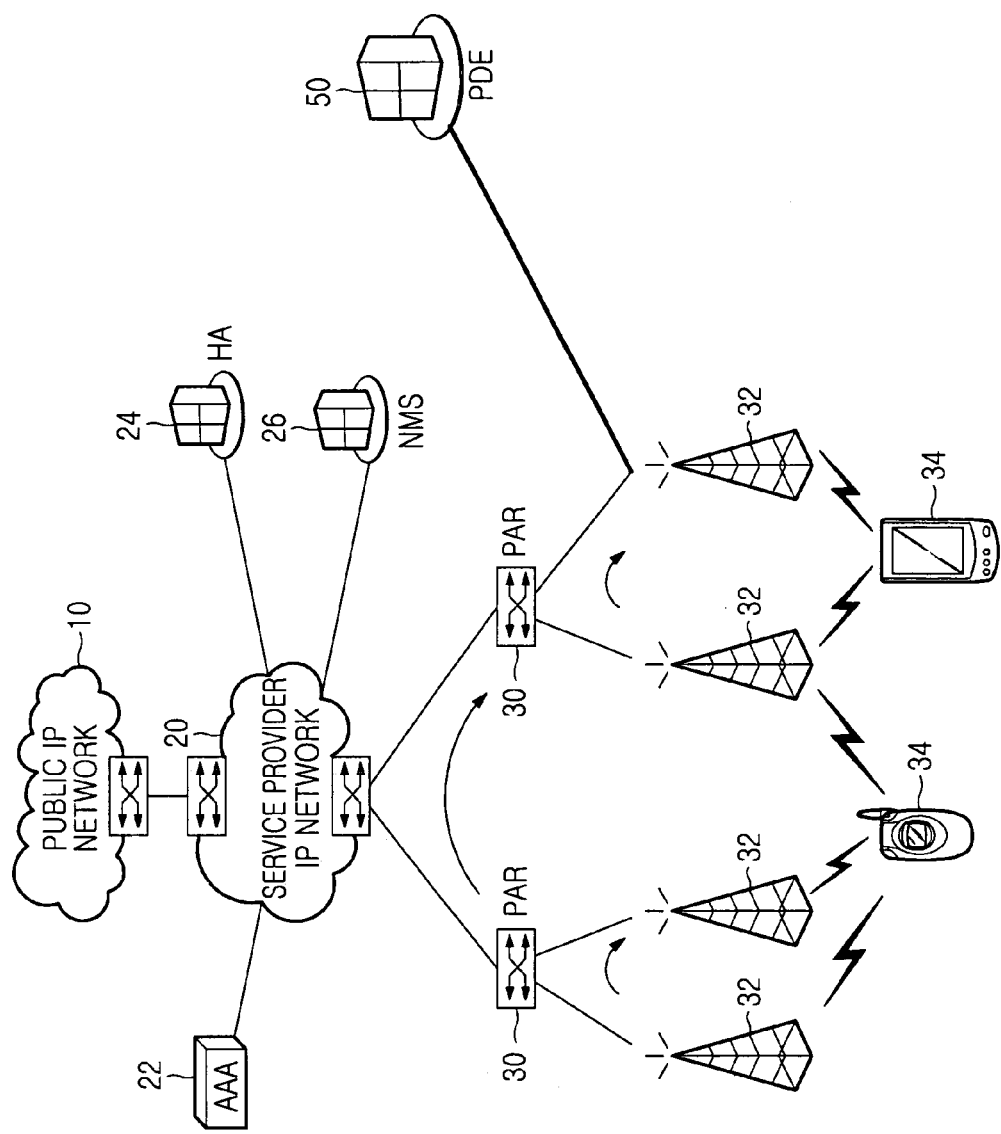
FIG. 1 is a view illustrating the construction of a mobile Internet system according to an embodiment of the present invention.

Preferred embodiments of the present invention will be described in detail hereinafter with reference to the accompanying drawings. In the following description of the present invention, the same drawing reference numerals are used for the same elements even in different drawings. Additionally, a detailed description of known functions and configurations incorporated herein will be omitted for the sake of clarity.

FIG. 1 is a view illustrating the construction of a positioning system using a mobile Internet signal according to the present invention.

Referring to FIG. 1, the positioning system may include access terminals (ATs) 34, access points (APs) 32, packet access routers (PARs) 30, a backbone network for connecting packet access routers 30 and a position determination entity (PDE) 50 for determining the position of the ATs.

The backbone network may include a service provider network 20, an authorization, authentication and accounting (AAA) server 22, a home agent (HA) server 24 and a network management server 26. The backbone network may also include servers for other purposes. The service provider network 20 provides a mobile Internet service over a public IP network. The AAA server 22 authenticates a user of the mobile Internet service. The home agent server 24 performs a home management. The network management server 26 performs a network management.

PAR 30 is connected with and manages a plurality of APs 32, and performs a handover control function to guarantee high-speed mobility in the APs. For this, an IP protocol based connection is made between APs 34 and PAR 30, and an Ethernet switch is provided to perform a high-speed packet transmission.

AP 32 performs wire/wireless channel conversion and transfers information received from AT 34 to PAR 30, or converts various information received from PAR 30 into wireless signals to be transferred to AT 34. APs 32 are time-synchronized, and perform a packet retransmission function for transmitting/receiving packets without an error, packet scheduling and wireless bandwidth allocation for an efficient operation of wireless resources. APs also perform a ranging function, packet call connection, maintenance, cancellation, a handover control function and a PAR connection function. APs 32 may be used as APs of an existing mobile communication network such as a CDMA system to reduce a network provider installation cost of APs.

AT 34 communicates with APs 32 that are end points of the wireless channel through mobile Internet transmission frames using an orthogonal frequency division multiple access (OFDMA) method. AT 34 also performs such functions as wireless channel transmission/reception, medium access control (MAC), handover, user authentication and encryption and wireless link control management. AT 34 receives a downlink signal from AP 32 and generates positioning information to calculate a range to AP 32 using the received downlink signal. For example, AP 34 calculates the numbers of received symbols and samples between the times when APs transmitted downlink signals and when AT received the downlink signals, and generates the positioning information including the number of symbols and the number of samples of the downlink signals. Then, AT 34 transfers the generated positioning information, i.e., the numbers of symbols and samples of the downlink frames, to APs 32. AT 34 may receive the downlink signals from APs 32 of the mobile Internet system as described above, and simultaneously receive pilot signals form APs of the mobile communication, such as a CDMA APs of a CDMA system.

When the pilot signal is received from the mobile communication AP, AT 34 generates the positioning information to calculate the range to AP 32 using the received pilot signal. For example, AT 34 calculates the number of PN phases of the received pilot signal, and generates the positioning information including the number of the PN phases of the calculated pilot signal. Then, AT 34 transfers the generated positioning information to AP 32.

PDE 50 calculates the ranges to APs 32 and AT 34 using the positioning information transferred from PDE 50. That is, PDE 50 calculates the ranges to APs 32 and ATs 34 using the numbers of the symbols and samples of the downlink frames received by AT 34 through APs 32. Additionally, PDE 50 calculates the ranges to the mobile communication APs 32 and AT 34 using the number of PN phases of the pilot signal received by AT 32 through the mobile communication AP. PDE 50 calculates a position of the AT using the calculated range.

Figure 2:
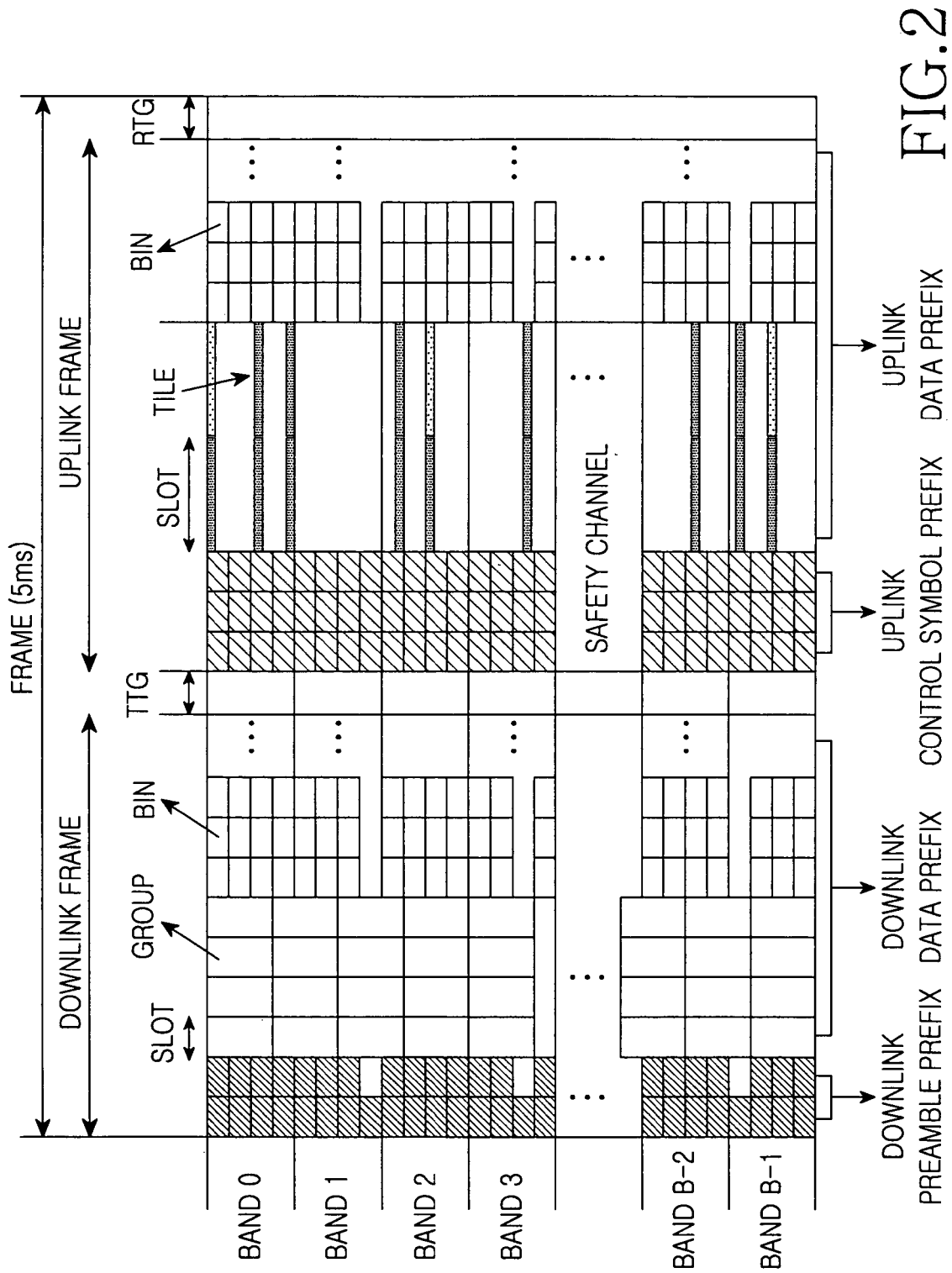
FIG. 2 is a view illustrating the construction of a frame transmitted by a mobile Internet system according to an embodiment of the present invention.

FIG. 2 is a view illustrating the construction of a frame transmitted by a mobile Internet system according to the present invention.

Referring to FIG. 2, the transmission frames of the mobile Internet system include an uplink frame and a downlink frame.

The uplink frame is composed of uplink control symbols and uplink data. The uplink data is at least composed of slots, tiles and bins. RTG of 40.4 [ms], which is a protection time for dividing the transmission time of the uplink frame, is located at an end position of the uplink frame.

The downlink frame is composed of a downlink preamble and downlink data. The downlink data is at least composed of slots, groups and bins. TTG of 121.2 ms, which is the protection time for dividing the transmission time of the uplink and downlink frames, is located at the end position of the uplink and downlink frames. The range between the AP 32 and the AT 34 is calculated using the downlink of the uplink and downlink frames of the above-described mobile Internet system.

Figure 3:
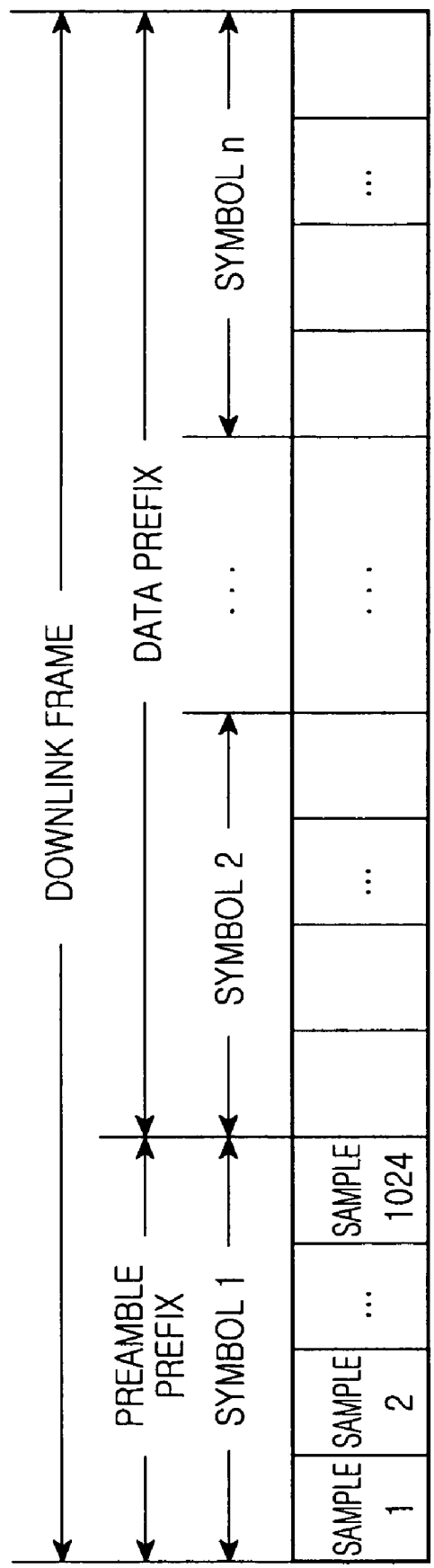
FIG. 3 is a view illustrating a downlink frame among transmitted frames according to an embodiment of the present invention.

FIG. 3 is a view illustrating a downlink frame among transmitted frames according to the present invention.

Referring to FIG. 3, the downlink frame is composed of a preamble prefix and a data prefix. The preamble prefix includes an initial synchronization of AT 34, a cell searching, a frequency offset and information for a channel estimation. The data prefix includes data information that AP 32 intends to transmit to AT 34.

The preamble prefix and data prefix are composed of symbols. One symbol time is 115.2 µs, and the pure symbol time except for the cyclic prefix is 102.4 µs. The respective symbol is composed of 1024 samples. Accordingly, one sample time becomes 102.4 µs/1024=100 ns. Since the sample and symbol move at the velocity of light, the range between AP 32 and AT 34 can be obtained if the numbers of symbols and samples of the downlink signal received from AP 32 to AT 34 for a reference time is known.

The range between AP 32 and AT 34 is obtained by Equation (1), $$R = (n\text{symbol} * 102.4 \text{ µs} + n\text{sample}\_ * 100 \text{ ns}) * 3 * 10^8 \text{ m/s} \quad (1)$$

where R denotes a range between AP 32 and AT 34, nsymbol denotes the number of symbols, 102.4 µs denotes the time for one symbol, nsample denotes the number of samples, 100 ns denotes the time for one sample and $3*10^8$ m/s denotes the velocity of light.

If the range between AT 34 and each AP 32 is calculated using Equation (1), the position of AT 34 can be obtained using the calculated range.

Figure 4:
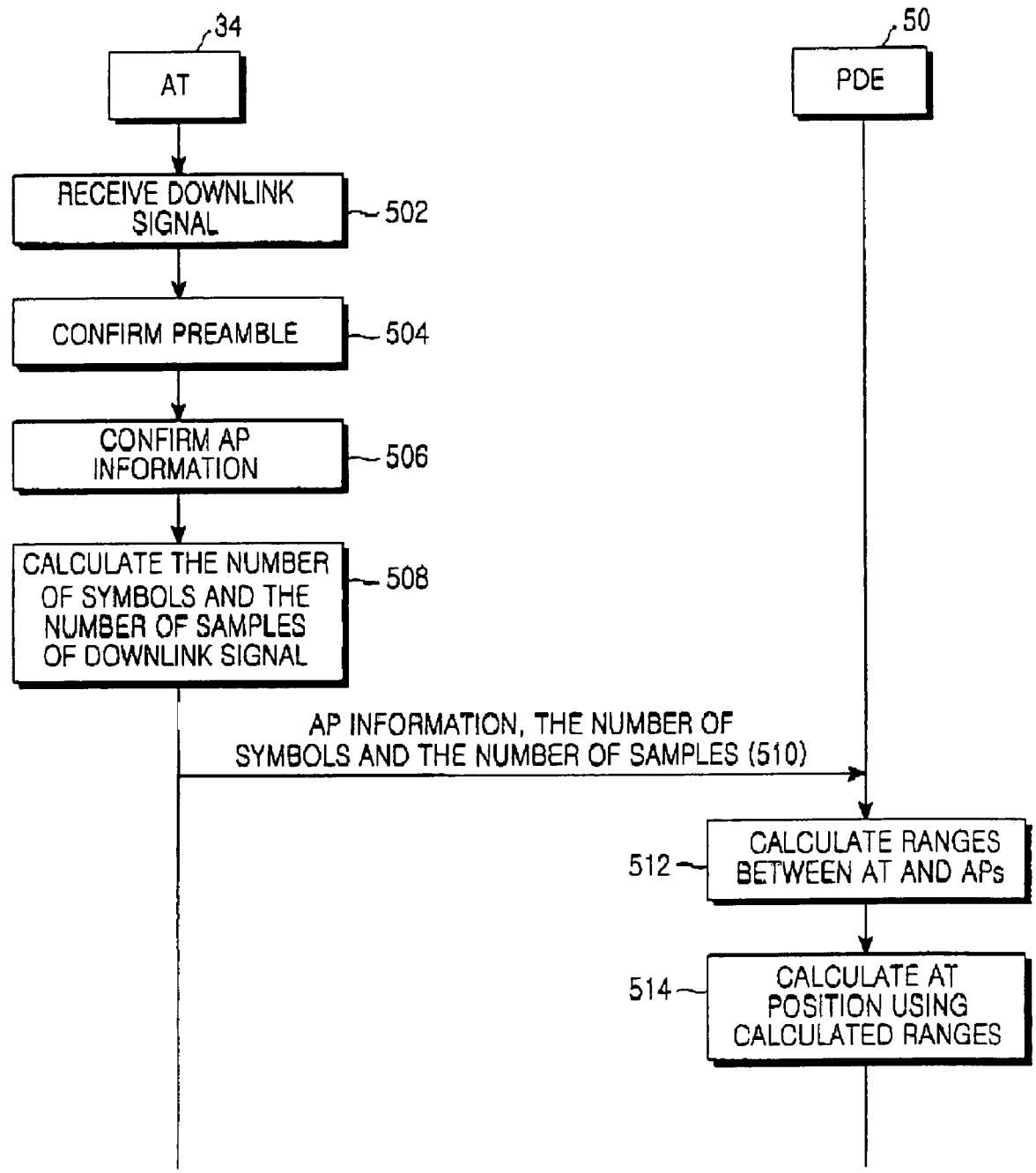
FIG. 4 is a flowchart illustrating a positioning method using a mobile Internet signal according to a first embodiment of the present invention.

FIG. 4 is a flowchart illustrating a positioning method using a mobile Internet signal according to a first embodiment of the present invention.

Referring to FIG. 4, AT 34 receives downlink signals in step 502. Since the positioning method according to the present invention uses a triangulation method, AT 34 has to receive downlink signals from at least three APs 32. In the first embodiment of the present invention, it is assumed that AT 34 receives downlink signals from three neighboring APs 32.

Figure 5:
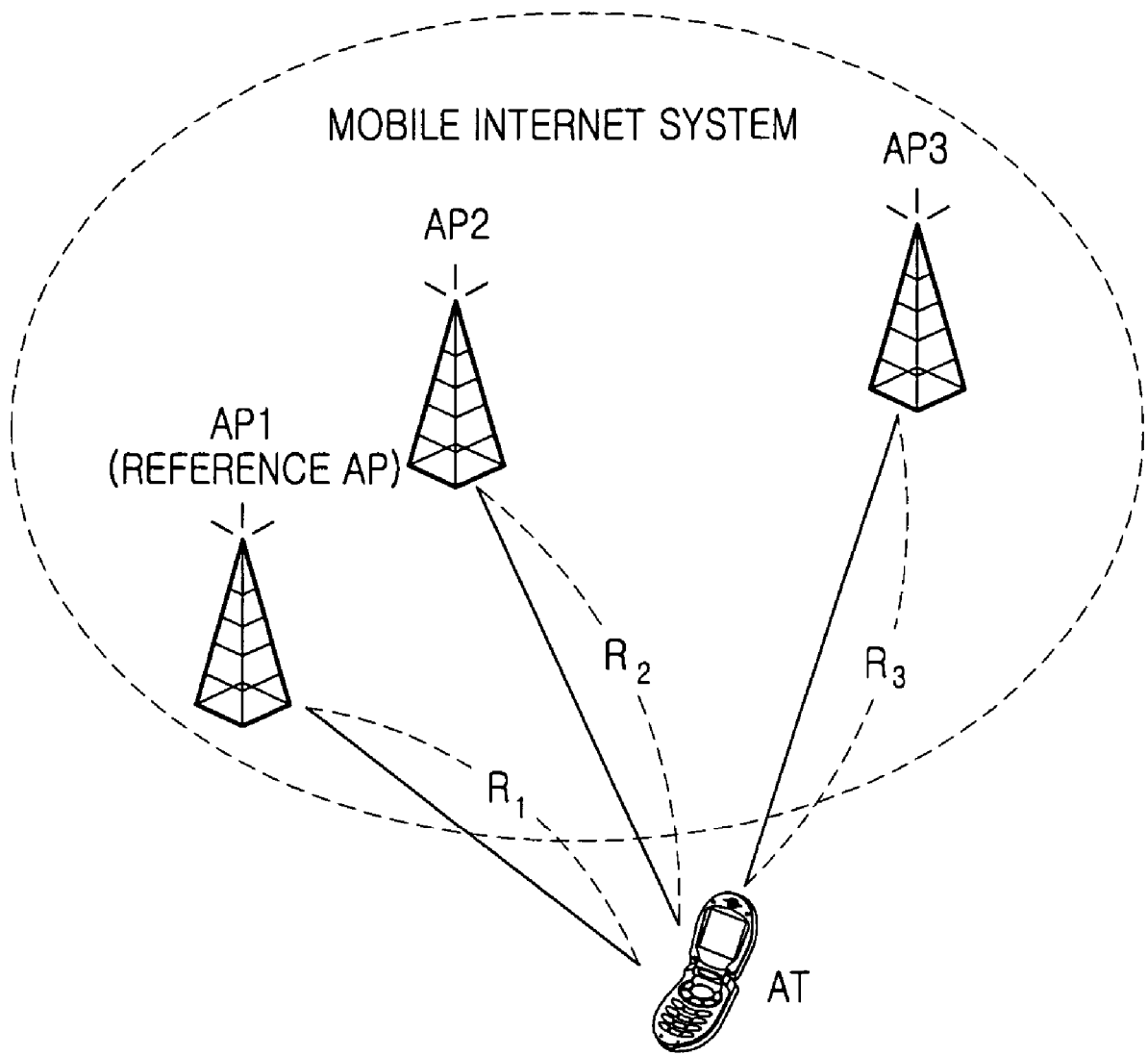
FIG. 5 is an exemplary view of an access terminal's reception of mobile Internet signals according to the first embodiment of the present invention.

FIG. 5 is an exemplary view showing an access terminal's reception of mobile Internet signals according to the first embodiment of the present invention. AT 34 receives downlink signals from neighboring AP1, AP2 and AP3.

Referring to FIGS. 4 and 5, when downlink signals are received from AP1, AP2 and AP3, AT 34 confirms preambles of the downlink signals in step 504. Using these preambles, AT 32 can determine from which AP the downlink signal was transmitted. Accordingly, AT 34 confirms AP information of the respective downlink signals in step 506.

AT 34 generates the positioning information to calculate the range to AP using the received downlink signal. At this time, the positioning information may be the number of symbols and samples of the received downlink signal.

Accordingly, AT 34 calculates the numbers of symbols and samples by extracting the symbols and samples from the downlink signals of APs 32. That is, AT 34 calculates the numbers of symbols and samples of the downlink signals received from AP1, AP2 and AP3. At this time, the numbers of symbols and samples received between the times when APs 32 transmitted the downlink signals and when AT 34 received the downlink signal are calculated. Then, AT 34 transfers the positioning information including the numbers of samples and symbols calculated for the downlink signals to PDE 50 in step 510.

PDE 50 calculates the ranges between AT 34 and APs 32 using the positioning information from the AT 34, i.e., the numbers of symbols and samples of the downlink signals in step 512. For example, using this positioning information from AT 34, PDE 50 calculates a range $R_1$ between AT 34 and AP1, a range $R_2$ between AT 34 and AP2, and a range $R_3$ between AT 34 and AP 3, respectively. The ranges can be calculated by Equation (1).

After calculating the ranges, PDE 50 calculates the position of AT 34 using the calculated ranges in step 514. By applying a time difference of arrival (TDOA) technique, PDE 50 produces a difference equation for obtaining a difference between an equation calculating the range between AT and the reference AP and an equation calculating the ranges between AT and the adjacent APs. Additionally, PDE 50 calculates the position of AT using the calculated difference equation and the calculated range values.

Figure 6:
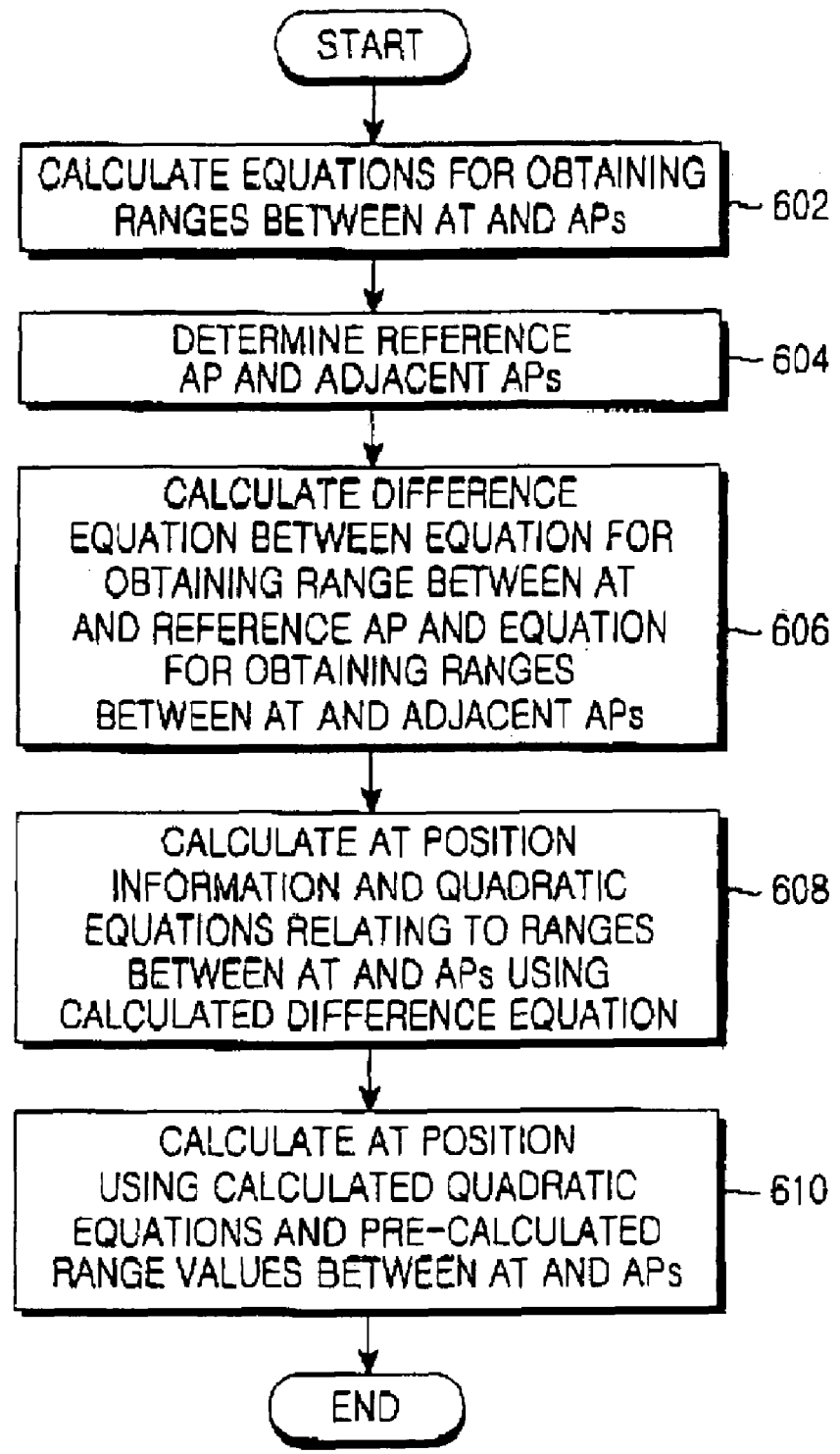
FIG. 6 is a flowchart illustrating a process of calculating a position of an access terminal using a mobile Internet signal according to the first embodiment of the present invention.

The process of calculating the AT position in step 514 is illustrated in detail in FIG. 6. Referring to FIG. 6, PDE 50 generates equations calculating ranges between AT and APs.

The ranges between AT and APs are obtained by Equation (2), $$R_i = \sqrt{(X_i - x)^2 + (Y_i - y)^2} \quad (2)$$
$$= \sqrt{(X_i^2 - 2X_i x + x^2 + (Y_i^2 - 2Y_i y - y^2)}$$
$$= \sqrt{X_i^2 + Y_i^2 - 2X_i x - 2Y_i y + x^2 + y^2}$$

where, $R_i$ denotes the range between AT and the i-th AP, (x, y) denotes position coordinates of the access terminal and ($X_i$, $Y_i$) denotes the position coordinates of the i-th AP.

For example, when APs for a position calculation are AP1, AP2 and AP3 as illustrated in FIG. 5, PDE 50 generates an equation for calculating a range $R_1$ between AT and AP1, a range $R_2$ between AT and AP2 and a range $R_3$ between AT and AP3, respectively.

As described above, after generating the equation for calculating the ranges between AT and APs, PDE 50 decides the reference AP and the adjacent APs for the position calculation of AT 34 in step 604.

After deciding the reference AP and the adjacent APs, PDE 50 produces the difference equation for obtaining a difference between the equation calculating the range between AT and the reference AP and the equation calculating the range between AT and the adjacent APs in step 606.

The differential equation can be obtained by Equation (3), $$R_{n,1} = R_n - R_1 \quad (3)$$

where, $R_n$ denotes the equation calculating the range between AT and the adjacent APs, $R_1$ denotes the equation calculating between AT and the reference AP, and $R_{n,1}$ denotes the difference between the equation calculating the ranges between AT and the adjacent APs, and the equation calculating the range between AT and the reference AP.

As illustrated in FIG. 5, assuming that the adjacent APs are AP2 and AP3, the difference equation between the equation calculating the ranges between AT and the adjacent APs and the equation calculating the range between AT and the reference AP can be calculated as follows.

$$R_{1,1} = R_1 - R_1, R_{2,1} = R_2 - R_1, R_{3,1} = R_3 - R_1$$

After calculating the difference equation such as Equation (3), PDE 50 calculates quadratic equations related to the position coordinates (x, y) of the AT and the ranges between AT 34 and APs using the difference equation. The quadratic equations can be calculated by Equation (4).

$$R_n = R_{n,1} + R_1 \quad (4)$$

$$R_n^2 = (R_{n,1} + R_1)^2$$
$$= R_{n,1}^2 + 2R_{n,1}R_1 + R_1^2 = X_n^2 + Y_n^2 - 2X_n x - 2Y_n y + X^2 + y^2$$

$$R_{n,X}^2 + 2R_{n,1}R_1 = X_n^2 + Y_n^2 - 2X_n x - 2Y_n y + x^2 + y^2 - R_1^2$$

$$R_{n,1}^2 + 2R_{n,1}R_1 = X_n^2 + Y_n^2 - 2X_n x - 2Y_n y +$$
$$\qquad\qquad x^2 + y^2 - (X_1^2 + Y_1^2 - 2X_1 x - 2Y_1 y + x^2 + y^2)$$

$$R_{n,1}^2 + 2R_{n,1}R_1 = X_n^2 + Y_n^2 - 2X_{n,1}x - 2Y_{n,1}y + x^2 + y^2$$

In Equation (4), assuming that the position coordinates of the reference AP are $(X_1, Y_1)=(0,0)$, $X_{n,1}=X_n-X_1$, and $Y_{n,1}=Y_n-Y_1$, PDE 50 calculates the quadratic equations related to the position coordinates (x, y) of AT and the range $R_1$ from AT to the reference AP through Equation (5).

$$R_1^2 = x^2 + y^2 \quad (5)$$

In addition, using Equations (3) and (4), PDE 50 calculates the quadratic equations related to the position coordinates (x, y) of AT and the ranges $(R_2, R_3)$ from AT to the reference APs.

In step 608, PDE 50 calculates the AT position using the quadratic equations related to the position coordinates (x, y) of AT and the ranges $(R_2, R_3)$ from AT to the APs, and the ranges between ATs and APs calculated through the numbers of symbols and samples of the downlink signals, using a least square (LS) algorithm.

As described above, the AT positioning method of the present invention can perform the positioning indoors since the mobile Internet signal can be received even in such environments as downtown, shaded and indoor areas. Additionally, since the mobile Internet signal has a small receiving error, the AT positioning method using the mobile Internet signal is more accurate and has improved performance over the conventional positioning technologies using the existing pilot signals and GPS signals.

Although the position of the AT in the first embodiment of the present invention is measured using only the mobile Internet signals, the position of the AT may also be measured using both the mobile Internet signals and pilot signals of a mobile communication network.

Figure 7:
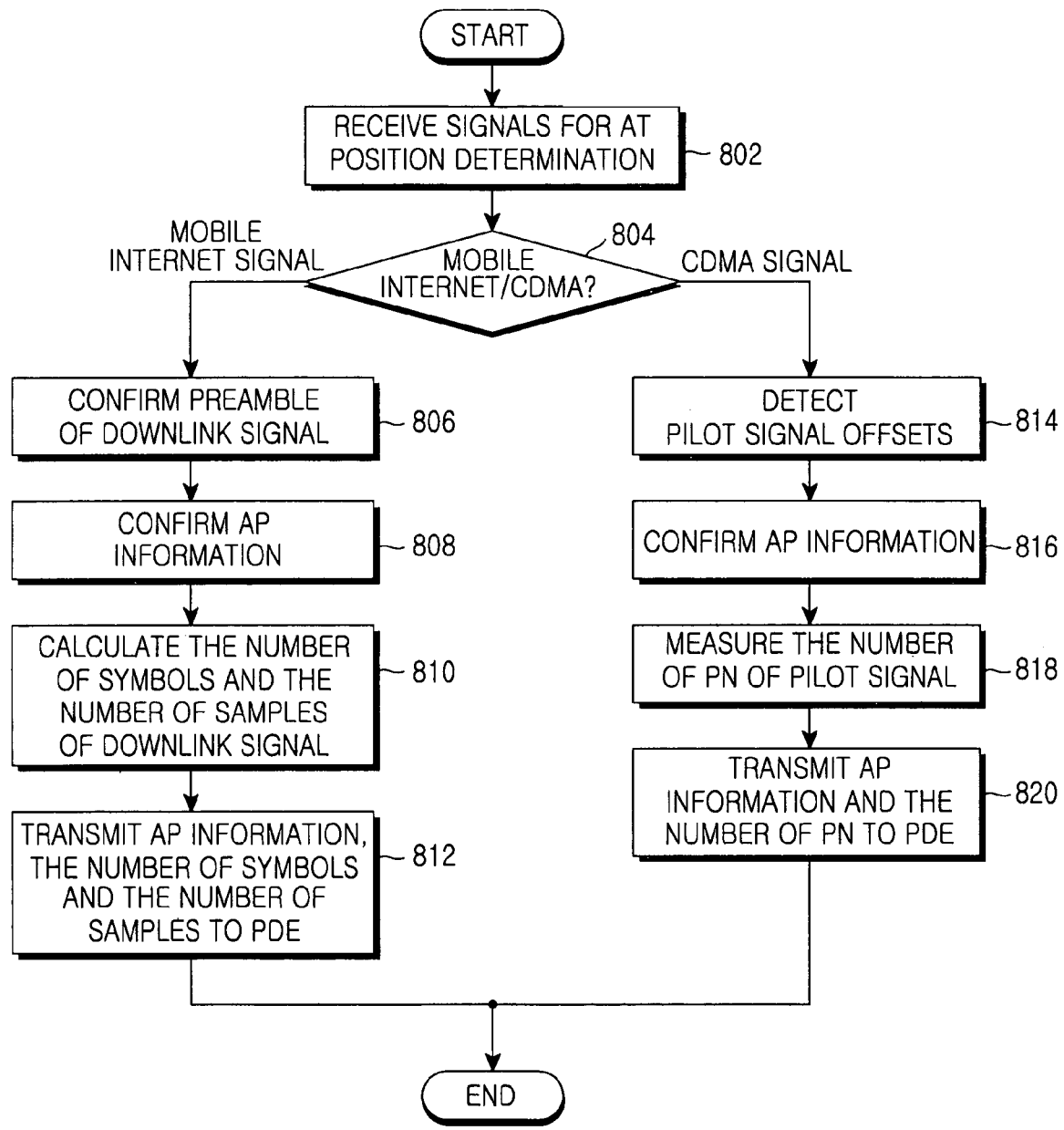
FIG. 7 is a flowchart illustrating a process of receiving mobile Internet signals and mobile communication signals through an access terminal according to a second embodiment of the present invention.

FIG. 7 is a flowchart illustrating a process of receiving mobile Internet signals and mobile communication signals through an access terminal according to the present invention.

Figure 8:
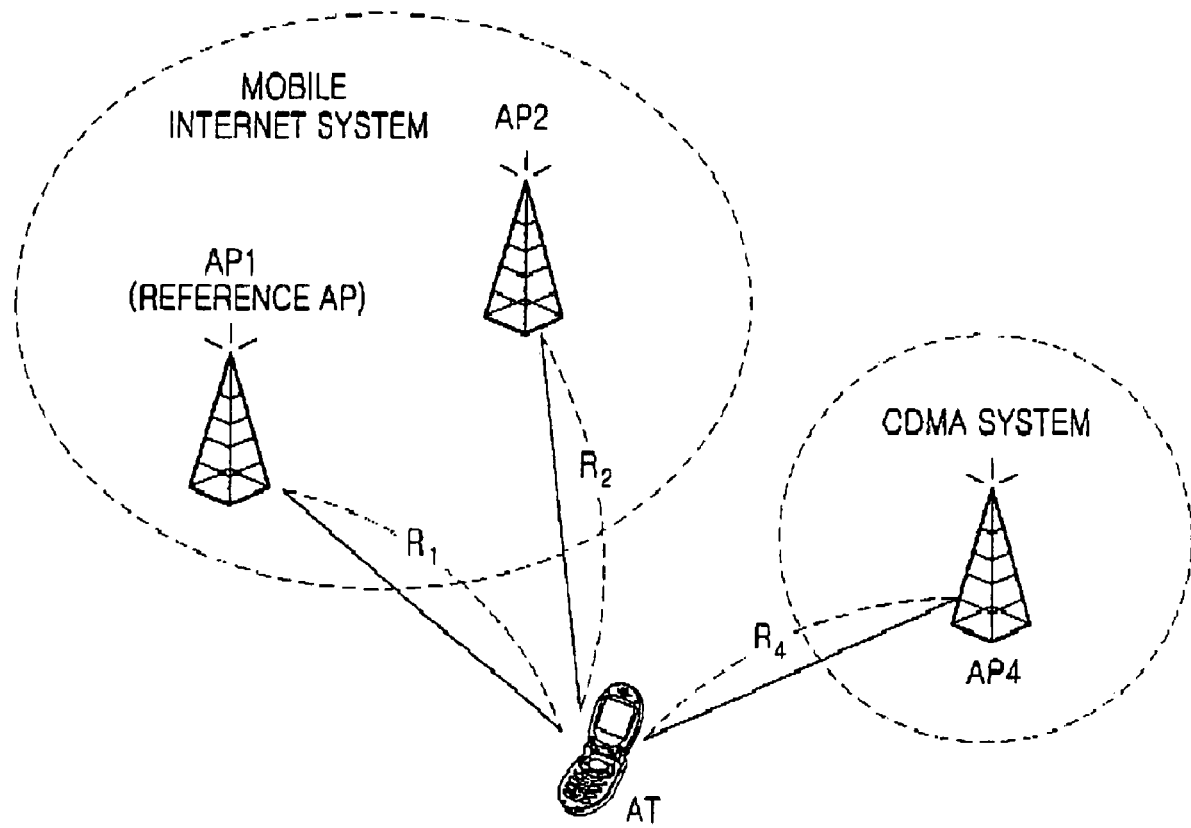
FIG. 8 is an exemplary view showing an access terminal's reception of mobile Internet signals and mobile communication signals according to the second embodiment of the present invention.

Referring to FIG. 7, AT 34 receives signals for an AT position determination in step 802. It is assumed that AT 32 can receive downlink signals from APs of a mobile Internet system and pilot signals from a CDMA access points of a CDMA system. FIG. 8 is an exemplary view showing an access terminal's reception of mobile Internet signals and mobile communication signals according to the second embodiment of the present invention. Referring to FIG. 8, AT 34 receives mobile Internet downlink signals from AP1 and AP2, and receives a CDMA pilot signal from AP4.

Referring to FIGS. 7 and 8, when the signals for the AT position determination are received, AT 34 checks whether the received signals are mobile Internet signals or CDMA pilot signals in step 804.

If the received signals are the downlinks signals of the mobile Internet system, AT 34 confirms preambles of the received downlink signals in step 806. Using these preambles, AT 34 can determine from which APs the respective downlink signals are transmitted. Accordingly, AT 34 confirms the AP information of the respective downlink signals in step 808.

AT 34 generates positioning information for calculating a range to AP using the received downlink signal. In this case, the positioning information may be the numbers of symbols and samples of the received downlink signal. In the second embodiment of the present invention, the positioning information calculated using the downlink signal of the mobile Internet is called a mobile Internet positioning information.

More specifically, AT 34 calculates the number of symbols and samples by extracting symbols and samples from the downlink signals of the respective APs 32 in step 810. That is, AT 34 calculates the numbers of symbols and samples of the downlink signals received from AP1 and AP2, respectively. Then, AT 34 generates mobile Internet positioning information that includes the number of symbols and samples calculated for the respective downlink signals and transfers the generated mobile Internet positioning information to PDE 50 in step 812.

When the received signals are the pilot signals of the CMDA system, however, AT 34 detects offsets of the pilot signals in step 814. Using these offsets, AT 34 can determine from which CDMA APs the pilot signals are transmitted. Accordingly, AT 34 confirms the CDMA AP information in step 816.

AT 34 generates positional information for calculating a range to AP using the receive pilot signal. In this case, the positioning information may be the number of PN phases of the received pilot signal. In the second embodiment of the present invention, the positioning information calculated using the pilot signal of the mobile communication system is called a mobile communication positioning information.

More specifically, AT 34 measures the number of pilot PN phases incoming between the times when CDMA AP transmitted the pilot signal and when AT 34 received the pilot signal in step 818. Then, AT 34 generates the mobile communication positioning information that includes the confirmed CDMA AP information and the number of PH phases of the pilot signal, and transmits the generated mobile communication positioning information to PDE 50 in step 820.

PDE 50 measures the position of AT 34 by using both the mobile Internet signal and the pilot signal of the mobile communication network.

Figure 9:
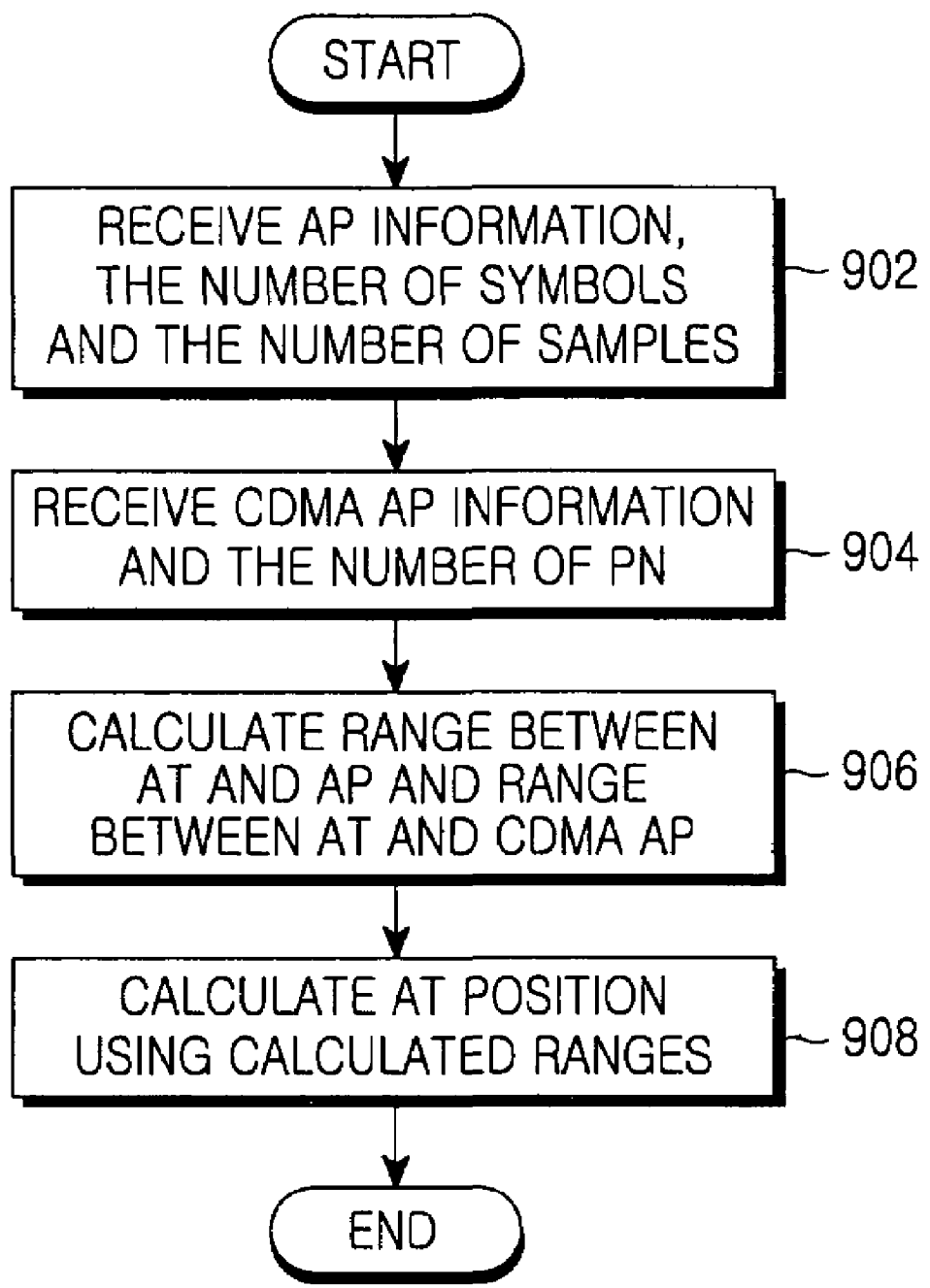
FIG. 9 is a flowchart illustrating a position calculating method using both mobile Internet signals and mobile communication signals according to the second embodiment of the present invention.

FIG. 9 is a flowchart illustrating a position calculating method using both mobile Internet signals and mobile communication signals according to the present invention.

Referring to FIG. 9, PDE 50 receives from AT 34 the respective AP information and the numbers of symbols and samples of the downlink signals received from APs in step 902.

PDE 50 also receives the CDMA AP information and the number of PH phases of the pilot signal received from the CDMA AP in step 904.

Then, PDE 50 calculates the range between AT and AP and the range between AT and CDMA AP in step 906. PDE 50 calculates the range between AT and AP as in Equation (1) using the numbers of symbols and samples incoming between the times when APs transmitted the downlink signals and when AT received the downlink signals.

PDE 50 also calculates the range between AT and CDMA AP using the number of pilot PH phases incoming between the times when CDMA AP transmitted the pilot signal and when AT received the pilot signal.

After calculating the range between AT and AP and the range between AT and CDMA AP as described above, PDE 50 calculates the position of AT using the respective calculated ranges in step 908. PDE 50 calculates a difference equation that obtains the difference between the equation obtaining the range between AT and reference AP and the equation obtaining the ranges between AT and CDMA AP and between AT and an adjacent AP by applying TDOA. Then, PDE 50 calculates the position of AT using the calculated difference equation and the calculated range value.

As described above, an accurate terminal position can be determined even in such environments as downtown, shaded and indoor areas by performing the positioning using the mobile Internet signal.

Also, since the positioning is performed using multiple signals including the mobile Internet signals and the existing mobile communication signals, the positioning error can be reduced.

Furthermore, the positioning can be performed by receiving both the mobile Internet signal and the mobile communication signals from a single AP when a mobile Internet AP and a mobile communication AP are simultaneously used.

While the present invention has been shown and described with reference to certain preferred embodiments thereof, it will be understood by those skilled in the art that various changes in form and details may be made therein without departing from the spirit and scope of the present invention as defined by the appended claims. For instance, although a separate PDE is used to determined the position of the terminal, the terminal itself may determine its position. Additionally, although the positioning method using the mobile Internet signal and the positioning method using both the mobile Internet signal and the mobile communication signal have been explained, the positioning can also be performed using both the mobile Internet signal and a GPS signal. Therefore, the scope of the present invention is not limited to the exemplary embodiments, but is defined by the appended claims or the equivalence thereof.

What is claimed is:

1. A positioning system using a mobile Internet signal, comprising:
   access points for transmitting downlink signals for mobile Internet communications;
   an access terminal for receiving the downlink signals and generating positioning information using the downlink signals and access point information on the access points; and
   a position determination entity (PDE) for calculating range values between the access terminal and the access points using the positioning information from the access terminal and determining a position of the access terminal using the calculated range values,
   wherein the PDE calculates respective calculation equations for obtaining ranges between the access terminal and the access points, determines a reference access point and adjacent access points from the access points, calculates a difference equation between a calculation equation for obtaining a range between the access terminal and the reference access point and calculation equations for obtaining ranges between the access terminal and the adjacent access points, calculates position information of the access terminal and quadratic equations relating to the ranges between the access terminal and the access points using the difference equation and calculates the position of the access terminal using the position information of the access terminal, the quadratic equations relating to the ranges between the access terminal and the access points and the range values between the access terminal and the access points.

2. The positioning system as claimed in claim 1, wherein the positioning information includes numbers of symbols and samples of the downlink signals.

3. The positioning system as claimed in claim 1, wherein the access terminal calculates numbers of symbols and samples of the downlink signals, and generates the positioning information that includes the numbers of symbols and samples.

4. The positioning system as claimed in claim 1, wherein the access terminal calculates numbers of symbols and samples incoming between downlink signal transmission and reception times.

5. The positioning system as claimed in claim 1, wherein the range values are calculated by the following equation, $$R=(nsymbol*102.4\ \mu s + nsample\_*100\ ns)*3*10^8\ m/s \quad (1)$$

where R denotes a range value between the access terminal and an access point, nsymbol denotes a number of symbols, 102.4 μs denotes a time for one symbol, nsample denotes a number of samples and 100 ns denotes a time for one sample.

6. The positioning system as claimed in claim 1, wherein the PDE calculates equations for obtaining the range values by applying a Time Difference Of Arrival (TDOA), and determines the position of the access terminal by using the equations and the range values.

7. A positioning system using a mobile Internet signal, comprising:
   access points for transmitting downlink signals for mobile Internet communications and pilot signals for mobile communications;
   an access terminal for receiving the downlink signals and the pilot signals, and generating positioning information using the downlink signals with access point information and the pilot signals, respectively; and
   a position determination entity (PDE) for calculating range values between the access terminal and the access points using the positioning information from the access terminal and determining a position of the access terminal using the calculated range values,
   wherein the PDE calculates respective calculation equations for obtaining ranges between the access terminal and the access points, determines a reference access point and adjacent access points from the access points, calculates a difference equation between a calculation equation for obtaining a range between the access terminal and the reference access point and calculation equation for obtaining ranges between the access terminal and the adjacent access points, calculates position information of the access terminal and quadratic equations relating to the ranges between the access terminal and the access points using the difference equation and calculates the position of the access terminal using the position information of the access terminal, the quadratic equation relating to the ranges between the access terminal and the access points and the range values between the access terminal and the access points.

8. The positioning system as claimed in claim 7, wherein the positioning information includes numbers of symbols and samples of the downlink signals, and a number of pseudo random noise (PN) phases of the pilot signals.

9. The positioning system as claimed in claim 7, wherein the access terminal calculates numbers of symbols and samples of the received downlink signals, calculates a number of pseudo random noise (PN) phases of the pilot signals, and generates the positioning information that includes the numbers of symbols and samples and the number of PN phases.

10. The positioning system as claimed in claim 7, wherein the access terminal calculates a number of pseudo random noise (PN) phases incoming between times when the access point transmits the pilot signals and the access terminal receives the pilot signals.

11. The positioning system as claimed in claim 7, wherein the PDE calculates equations for obtaining the range values by applying a TDOA (Time Difference Of Arrival), and determines the position of the access terminal by using the equations and the range values.

12. A positioning method using a mobile Internet signal, comprising:
receiving downlink signals from access points using an access terminal for mobile Internet communications;
generating positioning information using access point information on the access points and the downlink signals received from the access points;
calculating range values between the access terminal and the access points using the positioning information and calculating a position of the access terminal using the range values;
wherein the step of calculating the position of the access terminal comprises:
calculating respective calculation equations for obtaining ranges between the access terminal and the access points;
determining a reference access point and adjacent access points from the access points;
calculating a difference equation between a calculation equation for obtaining a range between the access terminal and the reference access point and calculation equations for obtaining ranges between the access terminal and the adjacent access points;
calculating position information of the access terminal and quadratic equations relating to the ranges between the access terminal and the respective access points using the difference equation; and
calculating the position of the access terminal using the position information of the access terminal, the quadratic equations relating to the ranges between the access terminal and the respective access points and the range values between the access terminal and the access points.

13. The positioning method as claimed in claim 12, wherein the positioning information includes numbers of symbols and samples of the downlink signals and a number of pseudo random noise (PN) phases of the pilot signals.

14. The positioning method as claimed in claim 12, wherein the range values are calculated by the following equation, $$R = (nsymbol*102.4\ \mu s + nsample\_*100\ ns)*3*10^8\ m/s$$

where R denotes a range value between the access terminal and an access point, nsymbol denotes a number of symbols, 102.4 μs denotes a time for one symbol, nsample denotes a number of samples and 100 ns denotes a time for one sample.

15. A positioning method using a mobile Internet signal, comprising:
transmitting downlink signals for mobile Internet communications and pilot signals for mobile communications from access points;
receiving the downlink signals from an access terminal;
generating mobile Internet positioning information and mobile communication positioning information using the access points; and
calculating range values between the access terminal and the access points using the mobile Internet positioning information and the mobile communication positioning information, and calculating a position of the access terminal using the range values,
wherein the step of calculating the position of the access terminal comprises:
calculating respective calculation equations for obtaining ranges between the access terminal and the access points;
determining a reference access point and adjacent access points from the access points;
calculating a difference equation between a calculation equation for obtaining a range between the access terminal and the reference access point and calculation equations for obtaining ranges between the access terminal and the adjacent access points;
calculating position information of the access terminal and quadratic equations relating to the ranges between the access terminal and the respective access points using the difference equation; and
calculating the position of the access terminal using the position information of the access terminal, the quadratic equations relating to the ranges between the access terminal and the respective access points and the range values between the access terminal and the access points.

16. The positioning method as claimed in claim 15, wherein the positioning information includes numbers of symbols and samples of the downlink signals.

17. The positioning method as claimed in claim 15, wherein the positioning information includes a number of pseudo random noise (PN) phases of the pilot signals.

18. The positioning method as claimed in claim 15, wherein the step of calculating the position of the access terminal comprises:
calculating equations for obtaining ranges between the access terminal and the access points by applying a TDOA (Time Difference Of Arrival); and
determining the position of the access terminal by using the equations and the range values.

* * * * *